May 14, 1929.  H. V. GREEN  1,713,223
MAGNETIC CIRCUIT CONTROLLER
Filed June 23, 1926   2 Sheets-Sheet 1

Inventor
Harold V. Green,
by
His Attorney.

May 14, 1929.  H. V. GREEN  1,713,223
MAGNETIC CIRCUIT CONTROLLER
Filed June 23, 1926   2 Sheets-Sheet 2
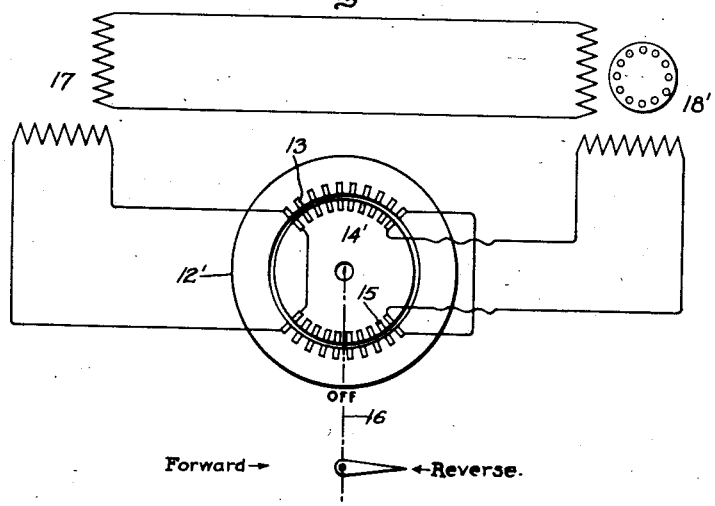
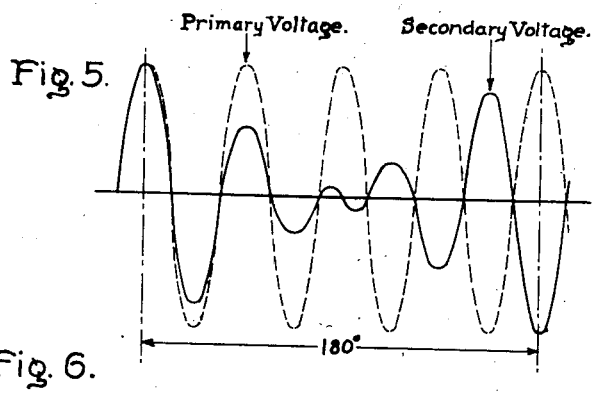
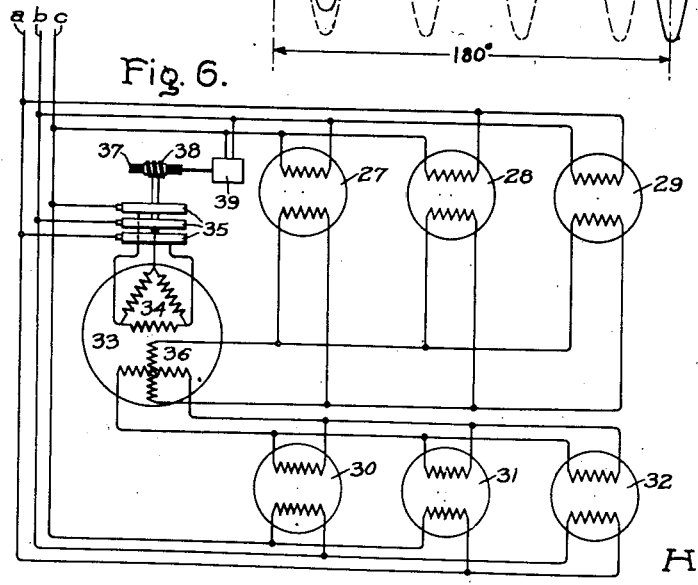
Inventor
Harold V. Green,
by
His Attorney.

Patented May 14, 1929.

1,713,223

UNITED STATES PATENT OFFICE.

HAROLD V. GREEN, OF CHICAGO, ILLINOIS, ASSIGNOR TO GENERAL ELECTRIC COMPANY, A CORPORATION OF NEW YORK.

MAGNETIC CIRCUIT CONTROLLER.

Application filed June 23, 1926. Serial No. 118,071.

My invention relates to controllers for electric circuits and its object is to provide a circuit controller in which the actual making and breaking of electric contacts is avoided entirely. Ordinarily electricity is transmitted from one device to another by a metallic electric circuit and when it is desired to disconnect one device from the other, or to modify the circuit connections so as to change the direction or magnitude of the electric energy transmitted, the metallic circuit is interrupted or altered by some sort of a switch. Cases arise where it is impracticable or undesirable to use a switch for such purposes; for example, in a factory where explosives or inflammatory material is present, circuit controllers having contacts which are liable to cause a spark when the circuit is made or broken are to be avoided.

When using alternating current it is possible to transform electrical energy from one metallic circuit into magnetic energy of a magnetic circuit and retransform this magnetic energy into electrical energy in the secondary circuit, which is the function of the transformer, induction regulator and similar apparatus. Now if we have electrical energy passing from one device to another through the medium of such a transformer it is possible to interrupt this flow of energy without breaking either of the metallic circuits by simply rendering ineffective, or in effect interrupting, the inductive coupling between the primary and secondary windings of the transformer. Likewise, the flow of energy may be partially interrupted by partially interrupting the mutual inductive relation of the primary and secondary coils, or phase relations may be reversed or altered by proper arrangement of the transforming apparatus as will hereinafter be explained in applying these principles upon which my invention is based.

Figure 1:
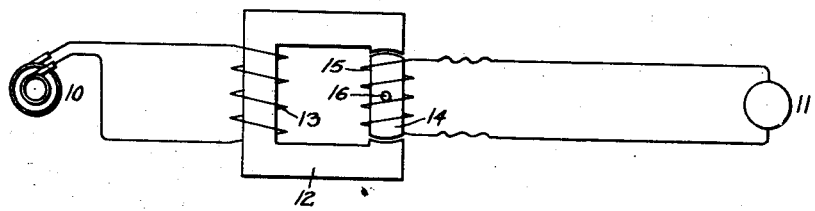
Figure 2:
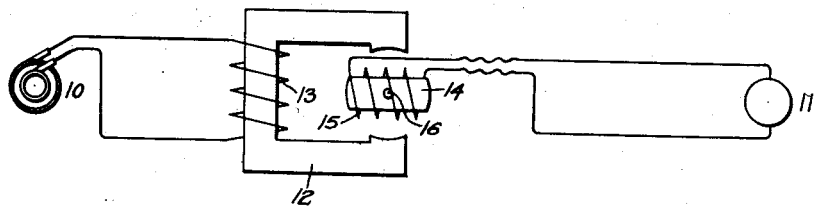
Figure 3:
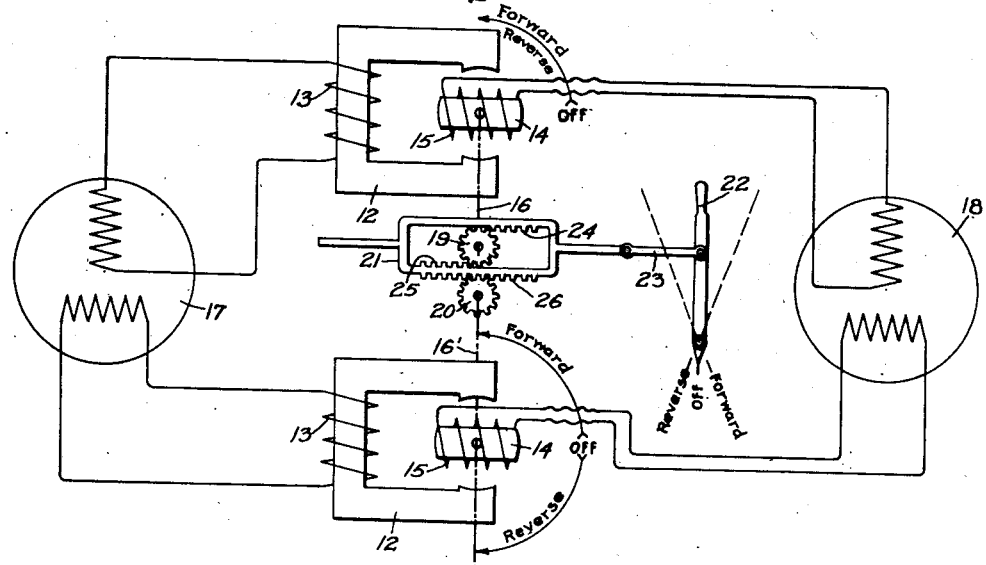

The features of my invention which are believed to be novel and patentable will be pointed out in the claims appended hereto. For a better understanding of my invention reference is made in the following description to the accompanying drawings in which Figs. 1 and 2 represent closed and open positions respectively of a simple circuit controller built in accordance with my invention; Fig. 3 represents the application of my invention to the regulation and reversing of a two-phase motor; Fig. 4 represents a further modification of the same idea; Fig. 5 shows curves representative of the change in the primary and secondary voltage relation brought about by apparatus such as is shown in Fig. 4; and Fig. 6 represents the application of my invention for reversing a plurality of motors in regular sequence.

In the drawings like parts are designated by like reference characters throughout. In Fig. 1, 10 represents a single phase source of alternating current arranged to supply apparatus designated at 11 through the circuit controller of my invention. The circuit controller has in this case a magnetic circuit made up of a stationary part 12 carrying a primary winding 13 and a movable part 14 carrying a secondary winding 15. It may be here noted that either of these parts may serve as the primary and that the transformer ratio may be selected to step the voltage up or down, as desired.

The movable part 14 is mounted on a shaft 16 and is arranged to be rotated. In Fig. 1 it is seen that the magnetic circuit is substantially closed and the apparatus will function as an ordinary transformer to transmit energy from the source 10 to the load 11.

Fig. 2 represents the same apparatus with the movable member 14 rotated into such a position as to completely interrupt the flow of energy between 10 and 11. It will be evident that by slowly turning the member 14 from the position shown in Fig. 1 to that shown in Fig. 2, the flow of energy may gradually be reduced from a maximum to zero and that the member 14 might be locked in any such intermediate position indefinitely, without injury, to regulate the amount of power transferred. By rotating the member 14, 180 degrees from that represented in Fig. 1, the phase relation between primary and secondary may be reversed. It is thus seen that this simple apparatus combines the functions of a transformer, a regulator, a circuit interrupter, and a reversing switch without interrupting any metallic electric circuits. While a rather large air gap is here shown between primary and secondary members for the sake of clearness it will be understood that in constructing the apparatus for commercial use such air gaps will preferably be reduced to a minimum and in many cases the iron surfaces will fit snugly against each other, particularly in the closed positions.

In Fig. 3, 17 represents a polyphase generator or source of supply, here shown as two phase, and 18 represents apparatus such as a two-phase motor supplied thereby. A circuit controller such as is shown in Fig. 1 is contained in each phase. The two shafts 16 and 16' of these controllers are extended as represented diagrammatically and are provided with gear wheels 19 and 20 respectively, cooperating with a common controlling mechanism comprising the rack frame 21, the lever 22, and the connecting link 23. The frame 21 has two internal racks 24 and 25 cooperating with the gear wheel 19, and an external rack 26 cooperating with gear wheel 20. The arrangement is such that in one position of lever 22 marked "Forward" the circuits of both phases are magnetically closed; in another position marked "Off" the circuits of both phases are magnetically interrupted, and in a third position marked "Reverse" the two phases are magnetically closed again, but with one of the phases reversed with respect to the first mentioned relation. In the position represented the lever 22 stands in the middle or "Off" position and the magnetic circuits of both phases are open. If the lever 22 is moved to the "Forward" position, both movable elements 14 will rotate 90 degrees in the same direction, thereby completing the power circuit to motor 18 for a forward direction of rotation. If, however, the lever 22 is moved from the "Off" position to the "Reverse" position, the movable elements 14 will rotate 90 degrees in opposite directions and complete the power circuit to motor 18 for the reverse direction of rotation. Here again intermediate positions of lever 22 between "Off" and the other two marked positions will partially close the magnetic circuits of the two phases so that the power may be gradually regulated from a maximum for one direction of rotation to a maximum for the reverse direction of rotation without interrupting metallic circuits. It is obvious that other mechanical devices could be devised to produce the relative movement of the parts to thus perform the same function as the controller 22, 23, 36.

In Fig. 4 I have shown the two-phase source 17 and load 18' as in Fig. 3, but in Fig. 4 only one phase of the interconnecting lines contains my improved circuit controller which is of a somewhat different construction from that previously described. In this arrangement it is possible for a two-phase generator to regularly supply power to a two-phase motor as represented in Fig. 4 for one direction of rotation of motor 18', and then rotate the element 14' of the coupling transformer 90 degrees, permitting the motor 18' to operate single phase for the same direction of rotation. Now a polyphase induction motor such as is here represented at 18' running single phase acts as a phase converter and actually generates polyphase voltages in the inactive winding. Therefore in designing my circuit controller for such an application it is particularly desirable to have a complete magnetic circuit at all times, not only for the idle phase of the motor, but also for the idle phase of the generator. The circuit controller 12', 14' of Fig. 4 is designed to have a complete magnetic circuit in both primary and secondary at all times although the rotor may be placed in such a position that the primary and secondary windings or certain coils thereof have no inductive effect on each other. In general this is the preferred form of the apparatus and the controllers of Figs. 1, 2 and 3 will ordinarily be designed as shown in Fig. 4. If the rotating element 14' of this arrangement is revolved slowly through 180 degrees from the position shown, the voltage applied to the corresponding phase of the motor 18' will change slowly from full value to zero and then to full value in the opposite direction. This will occur without serious distortion in the motor. Then it is accordingly possible that the motor can be reversed continually and carry almost its full or single phase load capacity with satisfactory performance, making an ideal control for reversing service.

Fig. 5 illustrates the change occurring in the relation between primary and secondary voltages as the rotor element 14' is rotated through 180 degrees. The dotted wave represents primary voltage and the full wave the secondary voltage. It will be seen from this figure that when the secondary is exactly in phase with the primary the secondary frequency is identical with that of the primary. However as the secondary moves around it gradually gets out of phase and accordingly the effective generated voltage in the secondary coil is reduced to zero until at the half way or 90 degree rotation point it actually picks up one-half of a cycle or gains one-half of a cycle on the primary: It is equally proper to consider that the secondary loses one-half of a cycle with respect to the primary. This furnishes the differential necessary to reverse the motor after the secondary voltage has built up sufficiently to overcome the single phase torque produced by the other phase of the motor. The principle is not limited to two-phase apparatus but is generally applicable to polyphase apparatus. It will be evident that the rotor element 14' may be rotated continuously or intermittently either by hand or automatically, depending upon the nature of the requirements of the reversing operations controlled thereby, and that the reversing is produced by momentarily varying the frequency relation between the two coils of the motor until a half cycle change has been effected.

In Fig. 6 I have represented the application of my invention to the control of a plurality of reversing motors 27 to 32 respectively. These motors may be considered as driving washing machines in a laundry. In such an application the requirements are such that a washing machine should be run in one direction for a few seconds and then reversed and run in the opposite direction for about the same length of time. If the motors are all connected to the same source of supply it would not be advisable to reverse them all at the same time, but the best load distribution would result from reversing the motors one after the other in a regular sequence.

The arrangement shown in Fig. 6 is intended for such an installation. The power is supplied from a three-phase source the lines of which are represented by $a$, $b$ and $c$. It is noted that each of the six two-phase motors have a phase supplied directly from the three-phase source and the other phase supplied through the circuit controller diagrammatically represented at 33. The primary element 34 of the circuit controller is made the rotating element in this case and is a three-phase primary supplied through slip rings 35. The stationary secondary element 36 is two-phase. The primary rotor element 34 is mounted on a shaft carrying a worm gear 37 meshing with a worm 38 which is operated by a suitable timing motor 39. The speed of this motor 39 will therefore determine the secondary frequency of the circuit controller and the duration between reversals of the various motors controlled thereby. The motor 39 may be a constant speed electric motor provided with control means for varying its speed if it is desired to vary the timing relation of the reversing operations. As a result of this arrangement it will be evident that the secondary frequency of the circuit controlling device 33 may be made slightly different from the primary frequency and as a result each of the motors will be supplied at slightly different frequencies in their two phases. This will cause a reversal of each motor every few seconds in a manner substantially similar to that explained in connection with Fig. 5 except that the reversal cycle will ordinarily extend over a much greater number of frequency cycles than is represented in Fig. 5 and will thus cause the reversal of the phase relation to the motors and corresponding reversals in their direction of rotation. It is seen that the distribution of the various phases of the six motors with respect to the phases of the supply circuits is such that no two reversals come at the same instant but that all reversals are evenly distributed over the cycle of operation. Thus, while one phase of motors 27 and 30 are supplied from the same phase $bc$ of the three-phase source their other phases are supplied from different secondary phases of the regulator 33 and while one phase of motors 27 and 28 are supplied from the same secondary phase of regulator 33 the other phases of these motors are supplied from phases $bc$ and $ac$ respectively of the three-phase source.

In accordance with the provisions of the patent statutes, I have described the principle of my invention together with the apparatus which I now consider to represent the best embodiment thereof; but I desire to have it understood that the apparatus shown and described is only illustrative and that the invention may be carried out by other means.

What I claim as new and desire to secure by Letters Patent of the United State, is:

1. The method of periodically reversing the phase rotation of a polyphase alternating current supply system which consists in supplying different phases of said system with energy at slightly different frequencies.

2. The method of reversing the phase rotation of the energy supplied to a polyphase alternating current dynamo electric machine which consists in supplying different supply phases of said dynamo electric machine at slightly different frequencies.

3. The method of reversing a polyphase alternating current motor which consists in supplying different primary phases of said motor with energy at slightly different frequencies.

4. In an electric motor drive system wherein a polyphase electric motor is supplied from a polyphase source, control apparatus for periodically reversing said motor without interrupting metallic supply circuits comprising means included in one of the supply phases of said motor for transforming the frequency of the source to a slightly different frequency.

5. In an electric motor drive system including a polyphase electric motor, a source of supply therefor and control means included in one of the supply phases of said motor for transforming the frequency of said source to a slightly different frequency from that of the source whereby different phases of said motor are supplied at slightly different frequencies such that the phase rotation of said motor is periodically reversed.

In witness whereof, I have hereunto set my hand this 10th day of June, 1926.

HAROLD V. GREEN.